United States Patent
Zhuk

(10) Patent No.: US 7,966,093 B2
(45) Date of Patent: Jun. 21, 2011

(54) ADAPTIVE MOBILE ROBOT SYSTEM WITH KNOWLEDGE-DRIVEN ARCHITECTURE

(76) Inventor: Yefim Zhuk, Englewood, CO (US)

(*) Notice: Subject to any disclaimer, the term of this patent is extended or adjusted under 35 U.S.C. 154(b) by 708 days.

(21) Appl. No.: 11/965,063

(22) Filed: Dec. 27, 2007

(65) Prior Publication Data

US 2009/0187278 A1    Jul. 23, 2009

Related U.S. Application Data

(60) Provisional application No. 60/923,902, filed on Apr. 17, 2007.

(51) Int. Cl.
*G05B 19/04* (2006.01)

(52) U.S. Cl. ........ 700/246; 700/245; 700/247; 700/248; 700/255; 706/16; 706/47; 706/50

(58) Field of Classification Search .................. None
See application file for complete search history.

(56) References Cited

U.S. PATENT DOCUMENTS

| | | | |
|---|---|---|---|
| 5,819,008 A * | 10/1998 | Asama et al. | 700/255 |
| 6,266,577 B1 * | 7/2001 | Popp et al. | 700/248 |
| 7,725,418 B2 * | 5/2010 | Gupta et al. | 706/50 |
| 2003/0093182 A1 * | 5/2003 | Yokoyama | 700/245 |
| 2004/0036437 A1 * | 2/2004 | Ito | 318/568.12 |
| 2004/0162638 A1 * | 8/2004 | Solomon | 700/247 |
| 2005/0197739 A1 * | 9/2005 | Noda et al. | 700/245 |
| 2006/0184491 A1 * | 8/2006 | Gupta et al. | 706/47 |
| 2007/0239314 A1 * | 10/2007 | Kuvich | 700/245 |

* cited by examiner

*Primary Examiner* — Khoi Tran
*Assistant Examiner* — Jonathan L Sample

(57) ABSTRACT

The invention integrates software and knowledge engineering with robotics technology to improve robot-to-robot and robot-to-human conversational interface and provide on-the-fly translations of situational requirements into adaptive behavior models and further down to service scenarios for a collaborative robot teams.

21 Claims, 6 Drawing Sheets

ADAPTIVE MOBILE ROBOT SYSTEM WITH KNOWLEDGE-DRIVEN ARCHITECTURE

SUMMARY OF THE INVENTION

This invention will advance and integrate software and knowledge engineering and robotics technology to create a platform for the intelligent multi-robot systems that could share tasks and data and converse with people while translating new and changeable situational task requirements into adaptive behavior models.

These systems will manage complicated medication regimens for elderly people, call for help should an accident occur, participate in rescue operations and look for people trapped in a disaster, provide terrain mapping and building of complicated structures in environments not suited for human beings.

BACKGROUND OF THE INVENTION

A fundamental problem of current robotics and in general software applications is related to multiple translations from natural language of task requirements to compiled and integrated working systems. It takes tremendous resources and multiple teams to define a task, translate requirements into Boolean logics of primitive algorithms and bake them together with generic and specific services of software applications. The resulting cake is too film in spite of its name—Software.

Current systems are programmed upfront to perform relatively simple, well defined and predictable tasks.

Robotics systems with adaptive behavior must be able to create new applications on-the-fly.

SOA paved the road to turn applications into service orchestrations.

Knowledge-driven architecture is a natural evolutionary step in this direction that allows us to streamline a transition from requirements to working systems and place business rules and scenarios into the driving seat of complex applications.

Evolution of Software Architecture:

Some of us still remember time when a single program could include video and disk drivers as well as data storage functionality mixed with application-specific code. Today, we call this mix "spaghetti code" but it was necessity those days when no operating system or other layers were present.

A new paradigm was created when database (DB) and operating system (OS) vendors took part in the process, and most software developers could focus on the application layer.

Today, the application layer continues to consist of a mixture of generic services and business specifics. Service-oriented and data-driven architectures, rules engines, and similar approaches helped clear this mess and paved the road for knowledge-driven architecture that combines SOA and Ontology and allows business intelligence to directly drive applications.

This new approach is based on three major factors:
1. Intelligent enterprise systems require new mechanisms, architecture, and implementation methods that can be described as distributed knowledge technologies [1] and are based on integrated software and knowledge engineering.
2. Service-oriented architecture, web services and related developments have allowed us to free service descriptions and service invocations from service implementation details.
3. Knowledge-driven architecture combines service orchestrations with rich ontology expressions supported by knowledgebase containers.

In knowledge-driven architecture (KDA), business rules and application scenarios are directly expressed in the knowledgebase in almost natural language and represent a thin application layer that drives the application. This architectural advance can allow an enterprise to shorten development time and produce smarter systems that can quickly accommodate themselves to rapid changes.

There are tremendous benefits of using knowledgebase with pre-defined fundamental concepts and generic facts, events, and scenarios, created by knowledge engineers as multiple layers of data, where the next data layer can only come on top of existing data. This is very similar to the way we, people, learn when our memory looks for associations of new facts with pre-existing background data.

The knowledge layer that we add to systems brings us closer to the point where we can delegate more tasks (beyond inventory and order applications) to computers.

Ontology and Predicate Logic vs. Boolean Logic

In our current software development process, we use the limited vocabulary of programming languages based on boolean logic and the limited (hierarchical) relationships of the object-oriented approach.

Ontology and Predicate Logic have unlimited vocabulary, which brings us closer to natural language and to multiple relationships, and therefore to real life.

We can express more complexity with fewer words.

The knowledgebase is not an empty container like a database, but is a smart partner with fundamental knowledge. We need only add our specifics to existing generic facts and rules.

These lines are generated by a system during a conversation with a subject matter expert who described system requirements. Let's imagine this conversation.

SME: "Only administrator can assign and change member roles".

A system: "Can I rephrase it this way: Administrator authorizedToControl MemberRoles?"

SME: yes.

Conversational mechanism helps to translate situational requirements into close to natural language but more precise terms based on existing facts and rules. Each successful translation introduces another rule and increases the system power.

The integration of software and knowledge engineering is arriving on the scene in much the same way as object-oriented programming did when it replaced structural programming. Here are some of the most promising applications of this new approach:
1. Natural User Interface (NUI). Pattern recognition is applicable to images, voice, handwriting, and even translation from a foreign language. This makes a Natural User Interface (NUI), an interface selected by the user, a reality. You can type, use handwriting, or even speak with a foreign accent, and it will still be OK.
2. Direct Business. Subject matter experts will get the keys to development, and can directly enter their requirements as business rules and scenarios. End users will be able to change business rules and scenarios at run-time without asking for an upgrade or new project development.
3. Multiple factor resolution. When it comes to making a decision based on multiple factors, we have a hard time when the number of factors gets large. How many factors do you think you can handle? In such situations, we rarely find optimal or even good solutions. Applications powered by knowledge-driven architecture can help us here.

4. Smart data storage. Non-technical people will be able to use smart data storage platforms based on knowledge-driven architecture, while traditional storage mechanisms, like Oracle, can optimize back-end performance.
5. Common-sense applications. We can approach new tasks that require common-sense systems. Knowledge-driven architecture can accommodate such systems in a very affordable way.
6. Accelerated development tools. Development tool vendors will bring a new wave of tools for technical and not-so-technical people.
7. Distributed Knowledge Marketplace. Knowledgeable people tend to learn more and share their knowledge. Knowledge-powered systems will demonstrate similar behavior. Built-in to every Knowledge-Driven Architecture system, the distributed network communicator component can help connect the systems into distributed knowledge networks with simplified and more intuitive user-computer interaction. New ways to exchange and share knowledge and services will create markets that are distributed over the globe, and available to everyone who has privileges to contribute and consume data and services. New levels of collaboration will require new motivation and security mechanisms to enable distributed active knowledge networks.
8. A new world of applications and business markets.

One of the most interesting and promising opportunities is related to robotic systems. The invention improves robot-human interface and provides on-the-fly translation of situational requirements into adaptive behavior models and further down to service orchestrations for a team of robots.

Robots in knowledge-driven architecture are represented as a hierarchical system of controllers, where each controller offers its own set of services. Service descriptions, primitive and composite service orchestrations are collected in a Service Dictionary (SOA Dictionary) that provides a convenient conversational interface that helps to map changing requirements to new created on-the-fly behavior models to be communicated to robots as service orchestrations.

Robots as Hierarchical Controllers

An example in the FIG. 4, (see drawings) provides a simple illustration on how a human request is translated on-the-fly into a set of orchestrated services executed by a robot system.

A subject matter expert asks a robot system to clear the mine field. This command is interpreted by a system as a set of orchestrated service scenarios. Each scenario is communicated to a proper controller that execute the service or/and provides further interpretation down the line of controlled devices.

FIELD OF INVENTION

The present invention relates generally to the field of robotic systems. More specifically, the present invention discloses a system that enables on-the-fly translation of situational requirements into adaptive behavior models and further down to Scenario Orchestrations for a team of robots.

DESCRIPTION

Mobile robot system consists of multiple robot team members. Each team member has its own controller with a set of sensors and drivers that represent robot skills. Robot team members maintain mobile communications inside a team and to a distributed knowledge system (DKS) [1] that receives robot data and communicates back to robots adaptive team tasks based on changeable environments. DKS can also receive inputs from Subject Matter Experts who might provide new requirements. The controller represents a node in the DKS.

DKS is built on knowledge-driven architecture (KDA) [2]. Each DKS node includes knowledgebase with inference engine, Service Dictionary with multiple robot service descriptions, and conversational mechanism that helps a human to express robot team task requirements and translate them to executable service scenarios (orchestrations).

Multiple types of robots are described as a set of services and primitive service orchestration scenarios are captured in Service Dictionary. These primitive scenarios serve as basic blocks for creating on-the-fly complex situational scenarios, which are communicated to robot-teams and executed.

A complex situational scenario is usually initiated by a human in a conversational mode while interacting to DKS. Data coming from robots update knowledgebase and change initial requirements each time providing a new set of executable situational orchestration scenarios that redefine robot's personal and common goals (rescue operation, terrain mapping, locomotion and building of complicated structures, following suspected persons, different military applications etc.).

Each knowledge node (a subsystem of DKS) in the distributed system has its own specialization and provides best knowledge in a specific set of subjects. Intercommunications between knowledge nodes increase system ability to retrieve necessary piece of information from a proper knowledge node as well as ensure update and best learning opportunities for overall system.

DKS subsystems will help to collect information on robot services, classify robot services from business and technical perspectives and unify them with ontology representations that will extend Service Dictionary.

DKS subsystems will provide a convenient conversational interface that allows subject matter experts extend Service Dictionary with primitive and complex situational scenarios described close to natural language and translated to a subset of BPEL extended with ontology expressions DKS subsystems will provide an engine to execute these scenarios. Autonomous mobile robot has a set of sensors (light, sound, distance, touch, and vision), actuators, and wireless communication subsystem. It has a small size computer/controller that enables the robot personal role in the local environment and translates XML-based scenarios sent over WiFi into native robot commands.

The suggested infrastructure enables scalable and reliable multi-robot systems. The wide choice of heterogeneous autonomous robots is assumed. Each robot may have its own personal task and be a member of a sub group of robots with common tasks. Communication is possible between members of a group as well as between groups. All robots are in uncertain conditions in changeable environments. The whole community of robots maintains common Knowledge Base and Service Dictionary. New types of robots may be added without any system modifications.

BRIEF DESCRIPTION OF THE DRAWINGS

The present invention can be more readily understood in conjunction with the accompanying drawings, in which.

DETAILED DESCRIPTION

Figure 1:
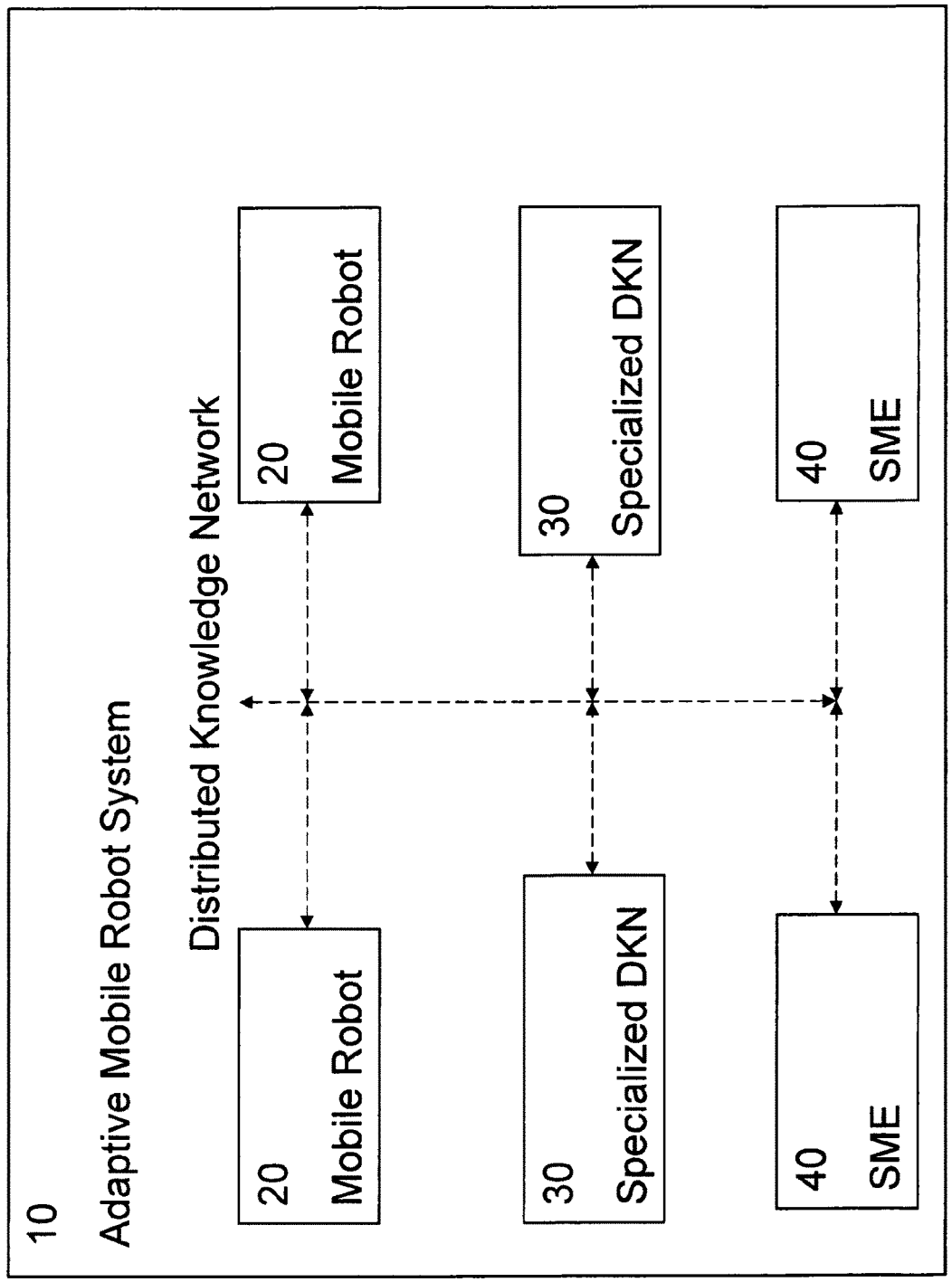
FIG. 1 is a diagram of the adaptive mobile robot system 10 with a plurality of mobile robots 20, and specialized knowledge centers or distributed knowledge nodes (DKN) 30, with possible connections to subject matter experts (SME) 40.

The following description is not intended to limit the present disclosure or applications and serves as exemplary in nature.

A fundamental problem of current robotics is a low level of adaptation to changeable situations. Robots are programmed to perform a limited number of operations and re-programming robots to new set of operations is a very heavy process. This process involves multiple translations from natural language of task requirements to compiled and integrated working systems. It takes tremendous resources and multiple teams to define a task, translate requirements into Boolean logics of primitive algorithms and bake them together with generic and specific services of robot controllers.

Then, the robot skills are hard or impossible to change.

Current systems are programmed upfront to perform relatively simple, well defined and predictable tasks.

The invention will advance several existing practices

1. Current robot systems use limited informational resources.

In the invention, robot systems consist of robot team members with multiple skills where each robot maintains connections to team members and to a distributed knowledge system (DKS) that receives robot data and communicates back to robots adaptive team tasks based on changeable environments. DKS is also open to communication to subject matter experts (SME) who might provide new requirements or/and clarify context. Each robot includes a hierarchy of controllers, Scenario Orchestration engine, and a distributed knowledge node (DKN) connected to DKS.

DKS also includes distributed knowledge nodes specialized in specific knowledge areas, for example, geo-spatial, chemical, mechanical, and etc. Each DKN includes knowledgebase with inference engine, Service Dictionary with multiple robot service descriptions, and conversational mechanism that helps a human to express and clarify requirements and translate them to executable service scenarios or service orchestrations.

2. Current robot systems are usually pre-programmed for a set of specific tasks.

Adding or changing robot skills and behavior means to add new or change existing pre-built programs. This is accomplished with a development process that starts with analysis and design and ends with coding, compilation, and deployment within development environment that supports this process.

In the invention, robot systems will expose all controls of robot sensors and drivers as ready-for-integration services that can be orchestrated or connected into new tasks by text-based scenarios without necessity of compilation or any other elements of development environment.

3. Current robot systems respond to a predefined set of commands and conditions that trigger execution of predefined tasks performed by the systems.

In the invention, robot systems include inference engine with predefined fundamental knowledge of facts and concepts that helps to directly transform a new set of requirements (based on new situational information or/and expressed in natural language) into a text based scenarios that re-define robot skills and behavior 4. Current robot systems have a very limited mechanism to converse with people or to support conversations between robot team members.

In the invention, robot systems will include natural language (NL) translator and enhanced conversational mechanism to communicate with SME as well as specialized communication channels to share information between robot team members.

5. Current robot systems rarely include robot teams with different skills and in such cases team member roles are pre-defined.

In the invention, robot systems will include multiple robots with different skills that can dynamically create and change team role hierarchies based on new conditions and interactions with SMEs.

6. Current robot systems use Boolean logics to express conditional behavior.

This requires multiple translations from NL-based requirements to primitives of programming languages.

In the invention, robot systems with knowledge-driven architecture will use predicate logics and ontology-based rules to express complex situations. Rules and NL-based conditions will be included directly in the Scenario Orchestration scenarios and executed by an orchestration engine. This engine will be able to interpret robot application scenario language as a specialized subset of XML extended with ontology expressions.

Turning to FIG. 1, the present invention consists of the plurality of mobile robots 20, and specialized knowledge centers or distributed knowledge nodes (DKN) 30, with possible connections to subject matter experts (SME) 40.

The plurality of mobile robots 20 represents a robot team where each team member has its own controller with a set of sensors and drivers that represent robot skills. Robot team members maintain mobile communications inside a team and to distributed knowledge network that receives robot data and communicates back to robots adaptive team tasks based on changeable environments. Distributed knowledge network can also receive inputs from Subject Matter Experts who might provide new requirements.

Figure 2:
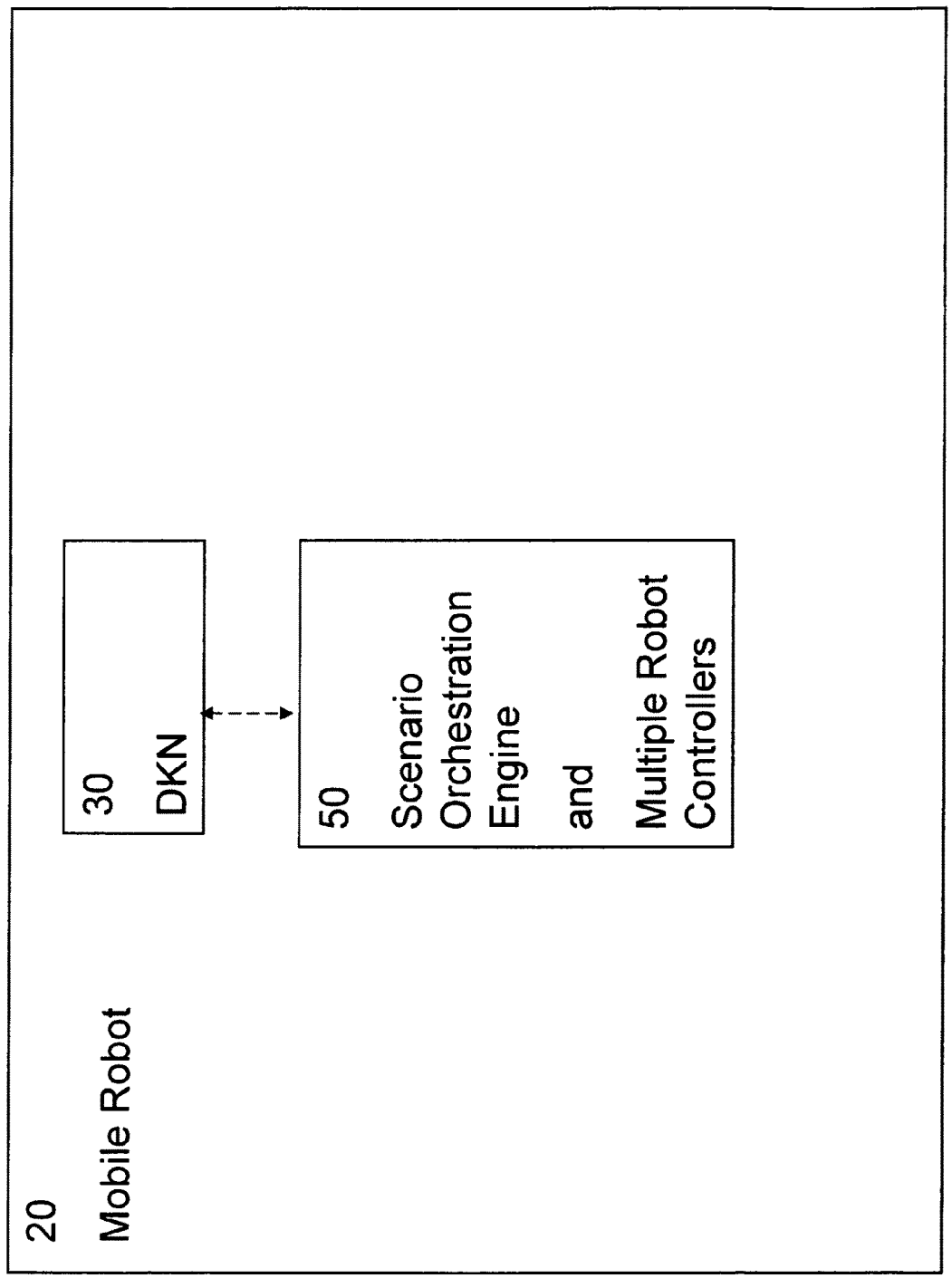
FIG. 2 is a diagram of a mobile robot 20 in which a distributed knowledge node (DKN) 30 is connected to a Scenario Orchestration engine and a hierarchy of robot controllers 50.

Turning to FIG. 2, the mobile robots 20 consists of a distributed knowledge node (DKN) 30 connected to a Scenario Orchestration engine and a hierarchy of robot controllers 50 (called later the Scenario Orchestration engine 50).

DKN 30 is connected to distributed knowledge network and translates multiple types of incoming data (specialized data from robot sensors, natural language from SMEs, etc.) into xml-based service scenarios to be executed by the Scenario Orchestration engine 50 that in its own turn translates these scenarios, formatted for example in XML, into invocations of robot functions via robot controllers.

Figure 3:
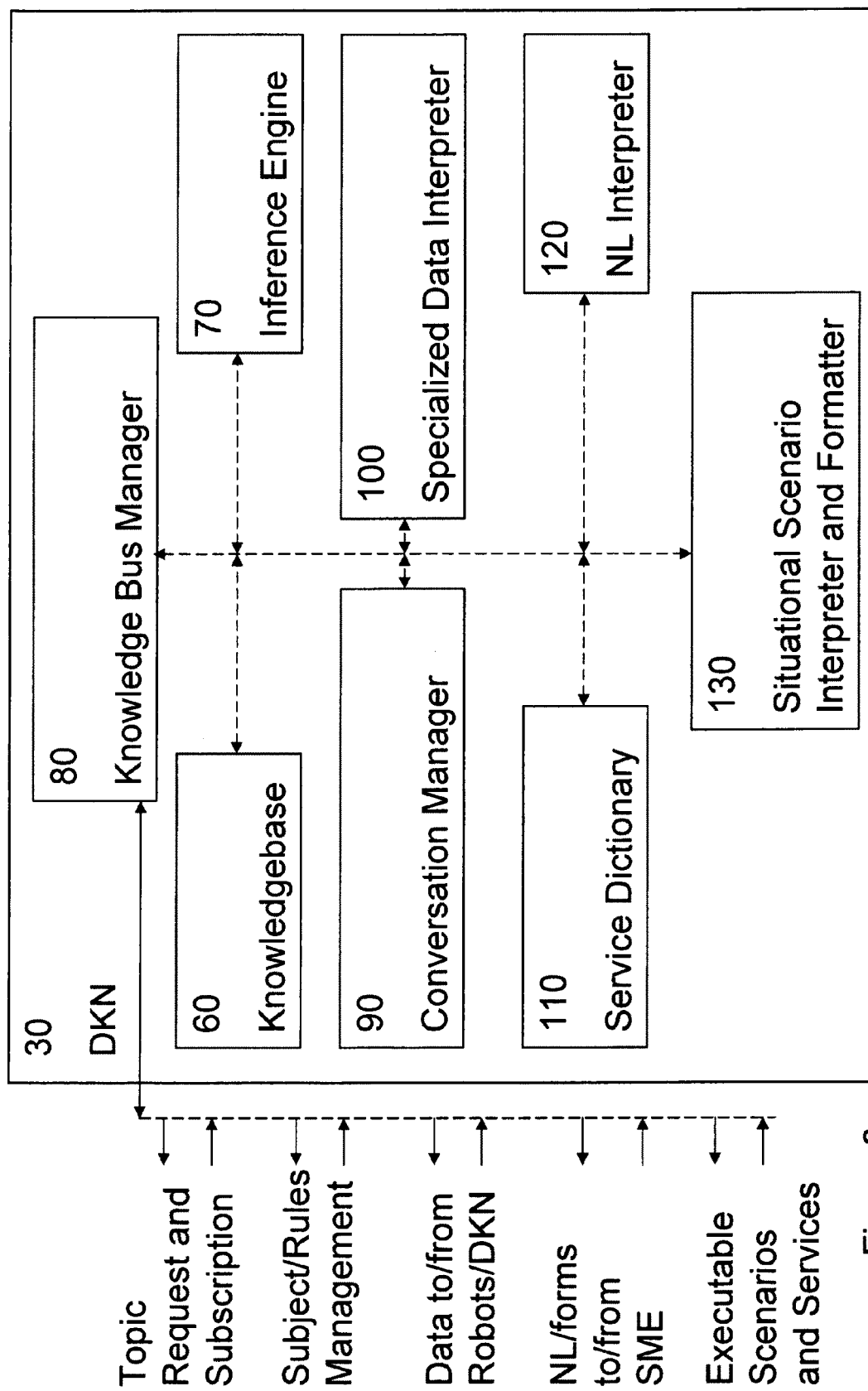
FIG. 3 is a diagram showing major components of a typical DKN 30, that includes knowledgebase 60, inference engine 70, Knowledge Bus Manager 80, Conversation Manager 90, specialized data interpreter 100, service dictionary with multiple service descriptions 110, natural language interpreter (NLI) 120, and Situational Scenario Interpreter and Formatter 130.

Turning to FIG. 3, the distributed knowledge node 30 consists of knowledgebase 60, inference engine 70, Knowledge Bus Manager 80, Conversation Manager 90, specialized data interpreter 100, service dictionary with multiple service descriptions 110, natural language interpreter (NLI) 120, and Situational Scenario Interpreter and Formatter 130.

Knowledgebase 60 includes pre-defined fundamental concepts, generic facts, and rules, created by knowledge engineers as multiple layers of data, where the next data layer can only come on top of existing data. This is very similar to the way we, people, learn when our memory looks for associations of new facts with pre-existing background data.

Knowledgebase 60 is connected to the inference engine 70 that checks for knowledge integrity with every information update. Knowledge Bus Manager 80 is connected to the external knowledge network or knowledge bus. Multiple types of data coming via the external knowledge bus are directed by the Knowledge Bus Manager 80 for consumption by the internal knowledge bus that connects the Knowledgebase 60, Inference Engine 70, Knowledge Bus Manager 80, Conversation Manager 90, Specialized Data Interpreter 100, Service Dictionary with 110, natural language interpreter (NLI) 120, and Situational Scenario Interpreter and Formatter 130.

Multiple robots 20 and specialized DKN 30 are connected to the external knowledge network-bus and can collaborate on task resolution and execution. Collaborative work in this distributed network is based on publish-subscribe mechanism where net members via the Knowledge Bus Manager 80 publish their skills and subscribe to related subjects.

Knowledge Bus Manager 80 as well as Conversation Manager 90 implement publish-subscribe messaging mechanisms where Knowledge Bus Manager 80 supports multiple knowledge areas or topics applicable to all distributed knowledge network-bus, while Conversation Manager 90 keeps track of current internal conversation topics that try to resolve new situational data into a formal situational scenario.

One or more DKN 30 that are specialized in this field related to situational requirements will intercept the request and subscribe via the Knowledge Bus Manager 80 as participants to this request. At this point one of DKN 30 is registered in its Knowledge Bus Manager 80 as the team coordinator for this task-request. The team coordinator via the Knowledge Bus Manager 80 will confirm participation for selected DKN 30. The team coordinator and participants are selected based on skills, location, and workload criteria in two steps.

First, the team coordinator is selected based on criteria related to current request specifics. The mechanism of the selection is as follows. Each Knowledge Bus Manager 80 in the DKN 30 subscribed to the task calculates its fitness score based on the criteria and the request and sends the score and criteria indicators to the network, so all scores are visible to all DKN 30. DKN 30 with the highest score will register itself in its Knowledge Bus Manager 80 as the team coordinator for the task. Alternatively, the team coordinator can be directly assigned, for example, by a subject matter expert at the very beginning when a request is formed.

After the team coordinator is selected, its Knowledge Bus Manager 80 evaluates other potential participants that subscribed to the task and confirms participation for selected participants if more than one participant is needed for the task. Evaluation and selection of participants is also based on skills, location, and workload criteria related to a current task request.

After participants are selected, each participant registers initial information in its Conversational Manager 90. Initial information includes the sender of the request and the request itself.

Knowledge Bus Manager 80 receives multiple types of data, like new requirements expressed in natural language or in filled-on-the-fly forms from SME 40; special data types from robot sensors or special DKN 30; requests to establish, manage, subscribe and publish knowledge topics from SME and DKN; scenarios for collaborative interpretation or/and execution coming from other DKNs.

Knowledge Bus Manager 80 distinguishes incoming data types and directs data coming from external knowledge network to proper interpreters 100, 120, and 130 based on data types. Special data types are interpreted by the Special Data Interpreter 100; natural language or filled-on-the-fly forms are interpreted by the NL Interpreter 120, and scenario data are interpreted by the Situational Scenario Interpreter and Formatter 130 (SSIF).

The SSIF 130 evaluates and tries to resolve scenario input into a well formatted scenario. In the process, SSIF 130 contacts the NL Interpreter 120 to check if parts of the scenario can be resolved into scenario and service keywords. SSIF 130 then contacts the Service Dictionary 110 to check if any parts of the scenario can be resolved via existing scenarios stored in the Service Dictionary 110.

Then, SSIF 130 sends the final or intermediate interpretation results to the Conversation Manager 90. Special Data Interpreter 100 as well as NL Interpreter 120 also sends the final or intermediate interpretation results to the Conversation Manager 90, which keeps track of the multi-cycle conversational interpretation process.

Knowledge Bus Manager 80 directs Topics or Rules related requests to Knowledgebase 60. In the case of knowledge update/change, the Knowledgebase 60 contacts the Inference Engine 70 to check for possible conflicts between the existing set of subject rules and definitions and the new set. Knowledgebase 60 and Inference Engine 70 send the result/status of their activity to the Conversational Manager 90, which makes a decision to end the conversation, if case is resolved or to start another conversational cycle by generating and sending a proper question or a form via the Knowledge Bus Manager 80.

The Conversation Manager 90 receives or sends requests, which represent new situational information in the form of specialized data coming from robot sensors, new requirements coming from subject matter experts in the natural language form, or xml-based executable scenarios. The Conversation Manager 90 interacts with Knowledge Bus Manager 80, specialized data interpreter 100, service dictionary 110, natural language interpreter (NLI) 120, and Situational Scenario Interpreter and Formatter 130.

Upon receiving a request, the Conversation Manager 90 initiates an iterative process where information is interpreted, formatted, and checked upon completion by the knowledge interpreter and Situational Scenario Interpreter and Formatter 130, that we'll call in the future the scenario formatter 130. If the information is not sufficient to complete a situational scenario in the current iteration, the Conversation Manager 90 uses the response from the scenario formatter 130 to form and send to knowledge network a new request that will start another cycle. Such a request will ask for more details that can better specify a situation in terms that can be resolved into an executable scenario. One of knowledge nodes 30 or subject matter experts 40 will respond to this request to supply more formal requirements to define a new situation.

The resulting scenario generated after one or several iterations will consist of rules and conditions related to situational information and service invocations or scenarios retrieved from the Service Dictionary 110.

Multiple types of robots are described as a set of services and primitive Scenario Orchestration scenarios. This information is captured in Service Dictionary 110 as text descriptions as well as formal XML-based service invocations extended with ontology expressions that capture rules and conditions related to service invocations in the form close to natural language. These primitive scenarios serve as basic blocks for creating on-the-fly complex situational scenarios, which are communicated to robot-teams for execution.

The new scenario resulting from new situational requirements will be also stored in the Service Dictionary 110 increasing the set of skills of the current knowledge node, that can represent a mobile robot 20 or specialized knowledge node 30 responsible for a specific knowledge area described by a set of knowledge topics.

The Scenario Data Interpreter and Formatter 130 reports completed scenario to the Conversational Manager 90 and further to the Knowledge Bus Manager 80 which can store a new scenario in the Service Dictionary 110 and send it for execution to the Service Orchestration Engine 50 of the current distributed node or if team responding to the task consists from more than one member, the scenario can be sent to another node selected by the team coordinator's Knowledge Bus Manager 80.

The Service Orchestration Engine 50 makes the final transformation of the service scenarios into service invocations of robot controllers using the Service Dictionary 110 where operations on robot sensors, drivers, and all kinds of controlled elements are stored as services The Knowledge Bus Manager 80 can receive new data from robot sensors and other sources during the execution of a scenario and arrange a new cycle of transformation of situational information into another executable scenario

EXAMPLE

Figure 4:
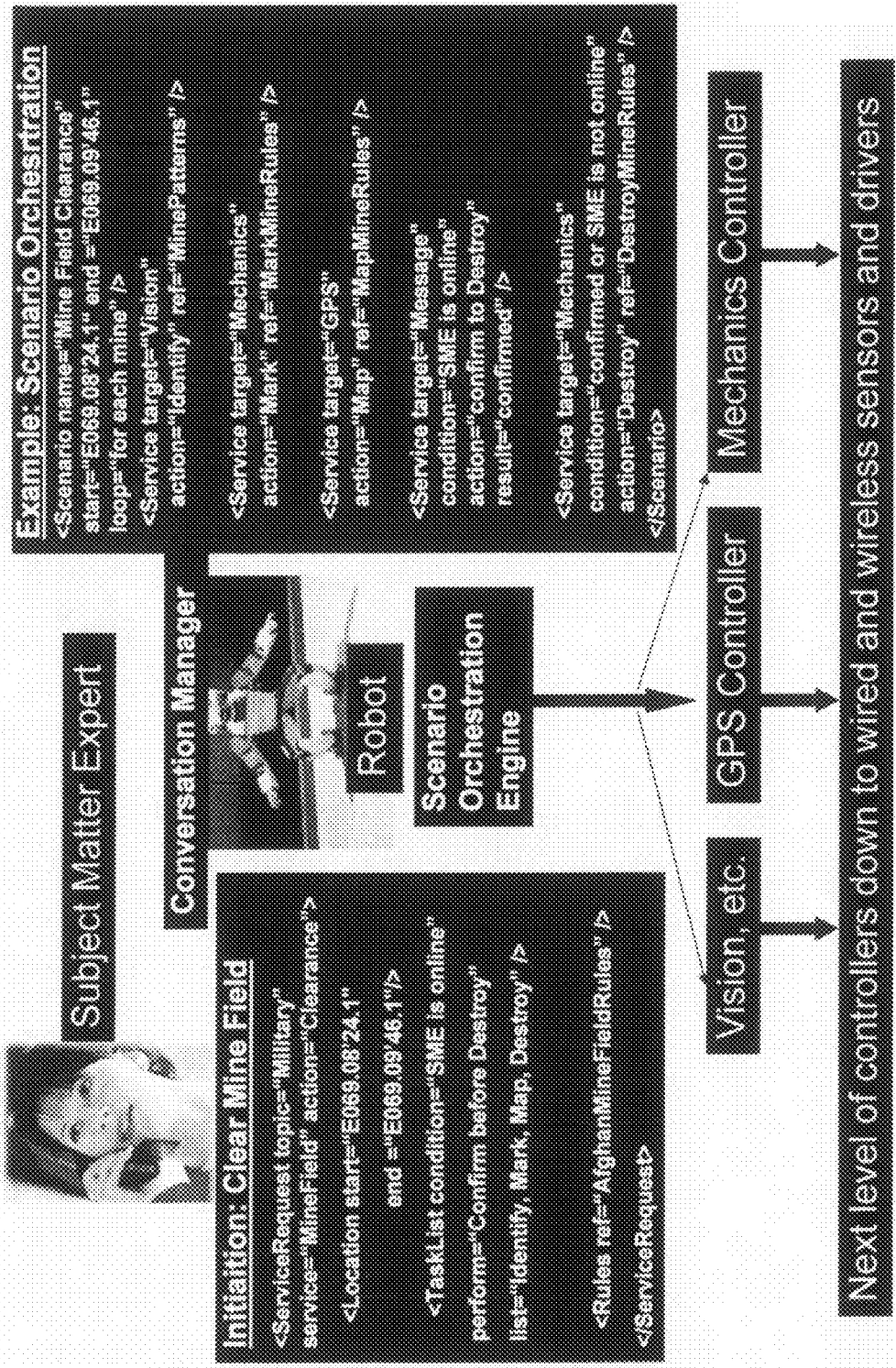
FIG. 4 provides a simple illustration on how a human request is translated on-the-fly into a set of orchestrated services executed by a hierarchy of robot controllers.
Figure 5:
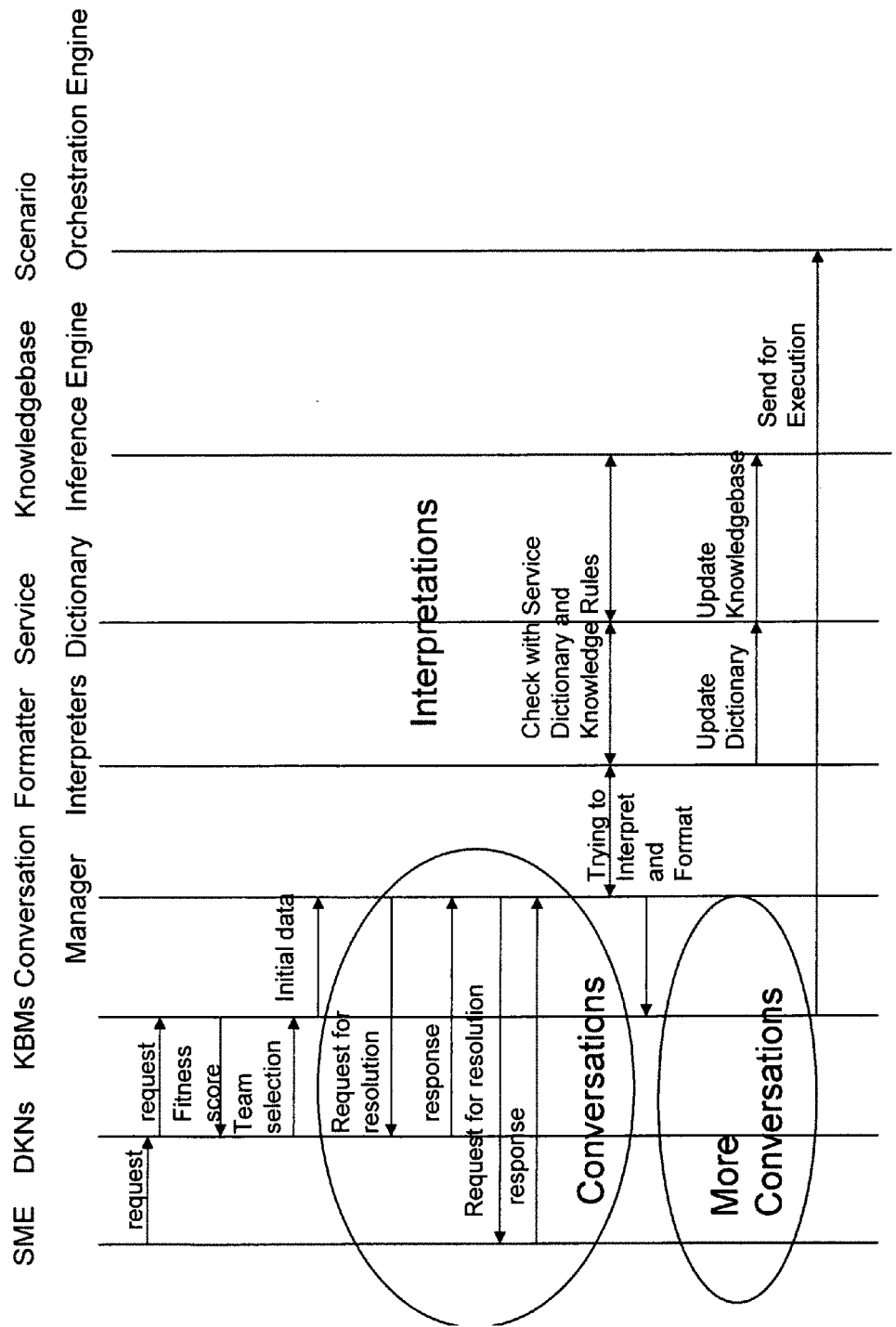
FIG. 5 is a sequence diagram showing an example of interactions between DKN components
Figure 6:
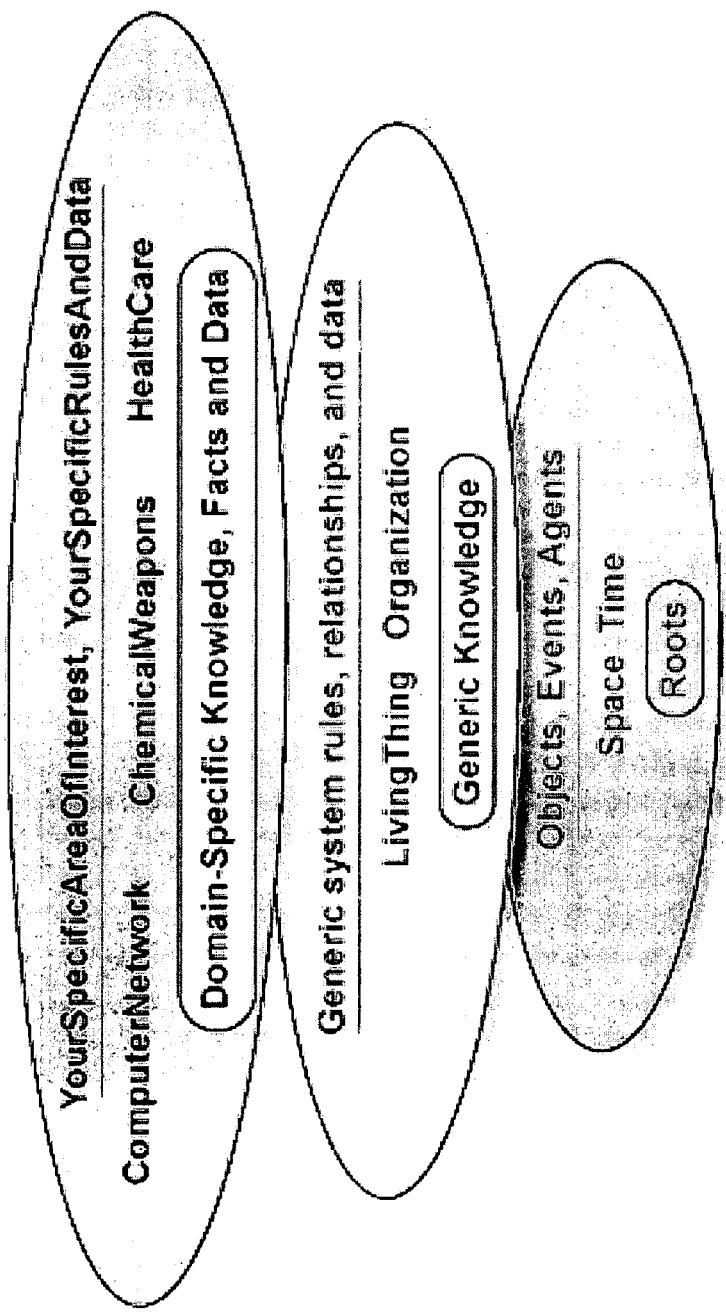
FIG. 6 is a diagram showing multiple layers of data in knowledgebase 60. There are tremendous benefits of using knowledgebase with pre-defined fundamental concepts and generic facts, events, and scenarios, created by knowledge engineers as multiple layers of data, where the next data layer can only come on top of existing data. This is very similar to the way we, people, learn when our memory looks for associations of new facts with pre-existing background data.

An example of such distributed collaborative work in conversational mode is provided in the FIG. 4.

Turning to the FIG. 4, a subject matter expert 40 sends a network request "Clear Mine Field". The request comes to the Knowledge Bus Manager 80 on multiple DKNs. The Knowledge Bus Manager 80 recognizes the natural language type of the request and sends it to the NLI 120. The NLI 120 interprets this request as Military related request for the MineField service with the Clearance action.

One or more DKN 30 that is specialized in this field and subscribed to the "Military" topic will intercept the request and subscribe via the Knowledge Bus Manager 80 as participants to this request.

After participants are selected based on their criteria indicators, each participant registers initial information in its Conversational Manager 90. Initial information includes the sender of the request and the request itself. In our example, only one participant will be selected and initial information that will be stored in the Conversational Manager will be the ServiceRequest with the topic="Military", the service="MineField", and the action="Clearance". This will start a conversation between the DKN 30 and the sender resulting in the formatted scenario to be executed by a robot team. The Conversation Manager 90 will send this initial data to the Scenario Formatter 130.

The Scenario Formatter 130 will produce and store the initial XML line below:
<ServiceRequest topic="Military" service="MineField" action="Clearance">

The Scenario Formatter 130 will check with the Service Dictionary 110 and report back to the Conversational Manager 90 that several expected parameters are missing. The Conversational Manager 90 will request via the Knowledge Bus Manager 80 these parameters: location coordinates and the list of tasks to perform. The Conversational Manager 90 will continue the conversation until the answers to its requests can be interpreted as service invocations confirmed by the Service Dictionary 110 and rules and conditions understood by Knowledgebase 60.

The initial "high-level" scenario is on the left side of the FIG. 4. See below:

```
<ServiceRequest topic="Military" service= "MineField" action=
"Clearance">
    <Location start="E069.08'24.1"
        end="E069.09'46.1" />
    <TaskList condition="SME is online"
    perform="Confirm before Destroy"
    list="Identify, Mark, Map, Destroy" />
    <Rules ref="AfghanMineFieldRules" />
</ServiceRequest>
```

The resulting "ready-for-execution" scenario is on the right side of the FIG. 4. See below:

```
<Scenario name="Mine Field Clearance"
    start="E069.08'24.1" end ="E069.09'46.1"
    loop="for each mine" />
        <Service target="Vision"
            action="Identify" ref="MinePatterns" />
        <Service target="Mechanics"
            action="Mark" ref="MarkMineRules" />
        <Service target="GPS"
            action="Map" ref="MapMineRules" />
        <Service target="Message"
            condition="SME is online"
            action="confirm to Destroy"
            result="confirmed" />
        <Service target="Mechanics"
            condition="confirmed or SME is not online"
            action="Destroy" ref="DestroyMineRules" />
    </Scenario>
```

It is possible that during the conversation a new subject or a rule is introduced by a SME. In this case the Conversation Manager 90 will ask the SME to express the new subject with existing subjects and rules, introduce a new rule with known terms, and will ensure knowledge integrity afterwards using the Inference Engine 70.

It is also possible that required service is not yet available to the Service Dictionary 110. In this case the Conversation Manager 90 will request the new service to be loaded at run-time and stored in the Service Dictionary 110.

Ready-for-execution scenario will be sent to a proper mobile robot or a robot team and executed by the Scenario Orchestration Engine working with multiple robot sensors and controllers 50.

The invention claimed is:

1. An adaptive mobile robot system with knowledge-driven architecture in communications with subject matter experts that describe the situation and assign robot tasks with situational requirements and comprising:

Distributed specialized knowledge nodes that store adaptive behavior models related to specific knowledge domains and provide components of these models as situational service scenarios with rule-based service invocations, while participating in transformation of new situational requirements into situational service scenarios;

at least one robot team with at least one robot that includes:
- a) A plurality of robot sensors that produce sensor data;
- b) A plurality of robot controllers that via service invocations define robot's behavior;
- c) Service Orchestration Engine connected to robot controllers and transforming service orchestration scenarios into rule-based service invocations, which can be executed by robot controllers;
- d) Specialized knowledge node (SKN) that interacts internally with Service Orchestration Engine within the robot and externally with distributed specialized knowledge nodes and subject matter experts to transform incoming situational requirements, information from other specialized knowledge nodes and robot sensor data into service orchestration scenarios that define robot's behavior models, wherein SKN includes:
  - (i) Service Dictionary describes and stores adaptive behavior models for each robot as a dynamically changeable set of services, service orchestrations that consist of composite services with a plurality of rule-based service invocations, and situational service scenarios that consist of plurality of composite services assembled into groups connected by conditional rules, which include sensor data describing situational components, where each group represents a component of robot's behavior in a specific situation;
  - (ii) Natural Language Interpreter interprets natural language based information coming from subject matter experts into a map of knowledge topics, subjects related to a described situation called in the future conversational subjects;
  - (iii) Situational Scenario Interpreter working in collaboration with the Natural Language Interpreter to transform-natural language based situational description and changeable situational task requirements into situational service scenarios that represent adaptive behavior models executed by robots;
  - (iv) Specialized Data Interpreter interprets plurality of special data formats including XML-based service descriptions, mechanical and video sensor data and transforms them into components of service orchestration scenarios;
  - (v) Conversation Manager initiates and maintains collaborative conversations between robots, specialized knowledge nodes and subject matter experts, while requesting existing components of situational service scenarios from distributed specialized knowledge nodes and additional information, corrections and clarifications of situational requirements from subject matter experts while transforming situational requirements into behavior models defined with situational service scenarios;
  - (vi) Knowledge Bus Manager distinguishes different types of data incoming to the common bus from internal and external sources, uses publish-subscribe mechanism to publish this information in message queues providing sequence and type identification to each data source, and makes this data available to distributed knowledge nodes and subject matter experts as well as internally to components-subscribers within SKN including Situational Scenario Interpreter, Natural Language Interpreter, Special Data Interpreter, Service Orchestration Engine, Service Dictionary and Conversational Manager.

2. The adaptive mobile robot system with knowledge-driven architecture of claim 1, wherein
The Specialized Knowledge Node translates multiple types of incoming data into xml-based service scenarios and the Scenario Orchestration Engine transforms service scenarios into rule-based service invocations thus dynamically defining adaptive behavior models on a plurality, of robot controllers.

3. The adaptive mobile robot system with knowledge-driven architecture of claim 1, wherein
Conversation Manager via the Knowledge Manager Bus initiates and maintains multi-directional data exchange-conversations between robots, distributed knowledge nodes, and subject matter experts, while Situational Scenario Interpreter working in collaboration with Natural Language Interpreter, Special Data Interpreter and Service Orchestration Engine are resolving new situational requirements into a well formatted situational service scenario with service orchestrations filled with rule-based service invocations.

4. The adaptive mobile robot system with knowledge-driven architecture of claim 1, wherein Specialized Data Interpreter, Natural Language Interpreter, and Situational Scenario interpreter, parse incoming data to transform them into situational service scenario formats and report their results to the Conversation Manager, which, upon receiving the failure of the attempt to transform situational requirements into service scenarios, starts another conversational cycle by generating a proper question sent to a proper channel, including internal and distributed knowledge nodes and subject matter experts, otherwise, upon receiving the success of transformation, the Conversation Manager ends the conversation and updates Service Dictionary by assembling successful results into service scenarios and knowledge rules.

5. The adaptive mobile robot system with knowledge-driven architecture of claim 2, where Service Dictionary, stores service orchestrations and situational scenarios that represent dynamically changeable behavior models as a set of skills for a robot and a specialized distributed knowledge node.

6. The adaptive mobile robot system with knowledge-driven architecture of claim 2, further comprising Knowledgebase, which includes pre-defined fundamental concepts, generic facts and rules and enables knowledge update.

7. The adaptive mobile robot system with knowledge-driven architecture of claim 3, wherein Knowledge Bus Manager
supports publish and subscribe mechanisms for multiple knowledge topics and types of data for external and internal communications;
is connected to messaging clients that are subscribed to this information including:
Natural Language Interpreter is subscribed to situational requirements coming from subject matter experts in natural language,
Situational Scenario Interpreter is subscribed to situational requirements and to the related conversational subjects provided by the Natural Language Interpreter, Specialized Data Interpreter is subscribed to data in special formats including sensor data and XML-based information, Service Orchestration Engine is subscribed to situational service scenarios and their components provided by internal Service Dictionary and coming from other robots and specialized knowledge nodes, Internal Service Dictionary and Distributed Specialized Knowledge nodes are subscribed to the requests for information from the Conversation Manager including requests for existing behavior models defined as situational service scenarios, Subject Matter Experts are subscribed to the requests from the Conversation Manager for clarification of situational requirements, Conversational Manager is subscribed to reports on success or failure of the interpretation cycle from Situational Scenario Interpreter and Service Orchestration Engine and to conversational subjects provided by the Natural Language Interpreter and upon receiving the conversational subjects the Conversation Manager initiates an iterative conversation cycle requesting information from internal components including Service Dictionary and robot's sensors and externally from other robots, distributed knowledge nodes and subject matter experts, where response data are coming via the Knowledge Bus Manager for interpretation, and if the information is not sufficient to complete a situational scenario in the current iteration, the Conversation Manager uses the response from the Situational Scenario Interpreter to form and send to Knowledge Bus Manager a new request that will start another conversational cycle with robots, distributed specialized knowledge nodes, and subject matter experts, requesting for more information from the following sources including specialized knowledge nodes with more precise and better formatted information, subject matter experts with more formal requirements, specific sensor of a specific robot in a specific team with additional information obtained at run-time until situational requirements can be completely resolved into an executable scenario or subject matter experts cancel the iteration.

8. The adaptive mobile robot system with knowledge-driven architecture of claim 2, wherein built-in robot knowledge node participates in a collaborative action by multiple robots and distributed specialized knowledge nodes and is assigned at run-time to play a specific role in this collaborative action.

9. The adaptive mobile robot system with knowledge-driven architecture of claim 1, wherein Distributed Specialized Knowledge Nodes respond to the situational requirements when requirements match knowledge topics registered in their Knowledge Bus Managers.

10. The adaptive mobile robot system with knowledge-driven architecture of claim 7, wherein Manager evaluate situational requirements and publish its criteria indicators and matching service scenarios to the network.

11. The adaptive mobile robot system with knowledge-driven architecture of claim 10, wherein The Knowledge Bus Manager with the highest score of service scenarios matching to incoming situational requirements, registers itself as the team coordinator for the request, and, when task requires more skills, services and efforts that can be provided by the selected coordinator, the coordinator will select and register more participants for the task based on their published criteria indicators and service scenarios.

12. The adaptive mobile robot system with knowledge-driven architecture of claim 6, wherein distributed knowledge node, further comprising:

the Inference Engine, which checks for Knowledgebase integrity with every information update;

the Inference Engine looks for possible conflicts between an existing set of rules and definitions and an incoming new set, while resolving situational requirements and situational data;

Knowledgebase and Inference Engine reports to the Conversation Manager success or failure such an update, and in the case of failure the Conversation Manager starts another conversation cycle by requesting for additional information.

13. The adaptive mobile robot system with knowledge-driven architecture of claim 3, wherein Conversational Manager registers initial information of situational requirements and converse with multiple parties, including robots, knowledge nodes and subject matter experts to resolve this information into instructional scenario executable by the system.

14. The adaptive mobile robot system with knowledge-driven architecture of claim 3, wherein Conversational Manager arranges data exchange between subject matter experts, Natural Language Interpreter, Service Dictionary and Knowledgebase, to transform situational requirements into situational service scenarios with specific rules added to the Knowledgebase and built-in and referenced by the resulting scenarios.

15. The adaptive mobile robot system with knowledge-driven architecture of claim 3, wherein Conversational Manager stores the resulting situational scenario and service orchestrations in the Service Dictionary dynamically changing the set of skills and behavior models of including but not limited to a particular robot and a specialized knowledge node.

16. The adaptive mobile robot system with knowledge-driven architecture of claim 4, wherein Situational Scenario Interpreter contacts the Service Dictionary and distributed knowledge nodes to check if any parts of the scenario can be resolved via existing scenarios stored in the internal Service Dictionary, as well as a Service Dictionary of one of distributed knowledge nodes.

17. The adaptive mobile robot system with knowledge-driven architecture of claim 4, wherein Specialized Data Interpreter interprets special data types, including robot's mechanical and video sensors.

18. The adaptive mobile robot system with knowledge-driven architecture of claim 7, wherein Situational Scenario Interpreter receives incoming information to create formatted service scenarios, which consist of service invocations and business logics provided by references to existing Knowledgebase rules and built-in scenario rules based on existing knowledgebase rules expressed in close to natural language format, including associated noun-constants and verb-predicates.

19. The adaptive mobile robot system with knowledge-driven architecture of claim 7, wherein Situational Scenario Interpreter reports completed scenario to the Conversational Manager and further to the Knowledge Bus Manager which stores a new scenario in the Service Dictionary and sends it for execution to the Service Orchestration Interpreter of the current distributed node and in the case when the team responding to the task consists from more than one member, the scenario is sent to node selected by the team coordinator's Knowledge Bus Manager.

20. The adaptive mobile robot system with knowledge-driven architecture of claim 2, wherein Service Orchestration Interpreter makes the final transformation of the service scenarios into service invocations of robot controllers using the Service Dictionary where operations on robot sensors, drivers, and controlled elements are stored as services and service scenarios.

21. The adaptive mobile robot system with knowledge-driven architecture of claim 7, wherein Knowledge Bus Manager can receive new data from robot sensors and other sources during the execution of a scenario and arrange a new cycle of transformation of situational information into another executable scenario.

* * * * *